Nov. 4, 1924.
C. W. MILES
ELECTRIC GENERATING APPARATUS AND METHOD
Filed Oct. 6, 1919   4 Sheets-Sheet 2
1,514,093
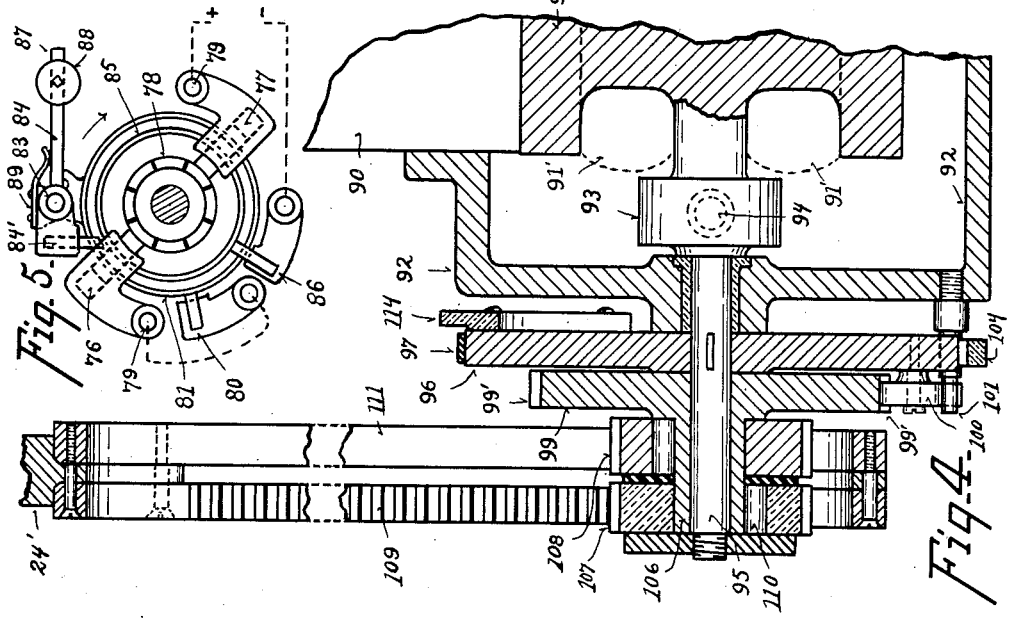
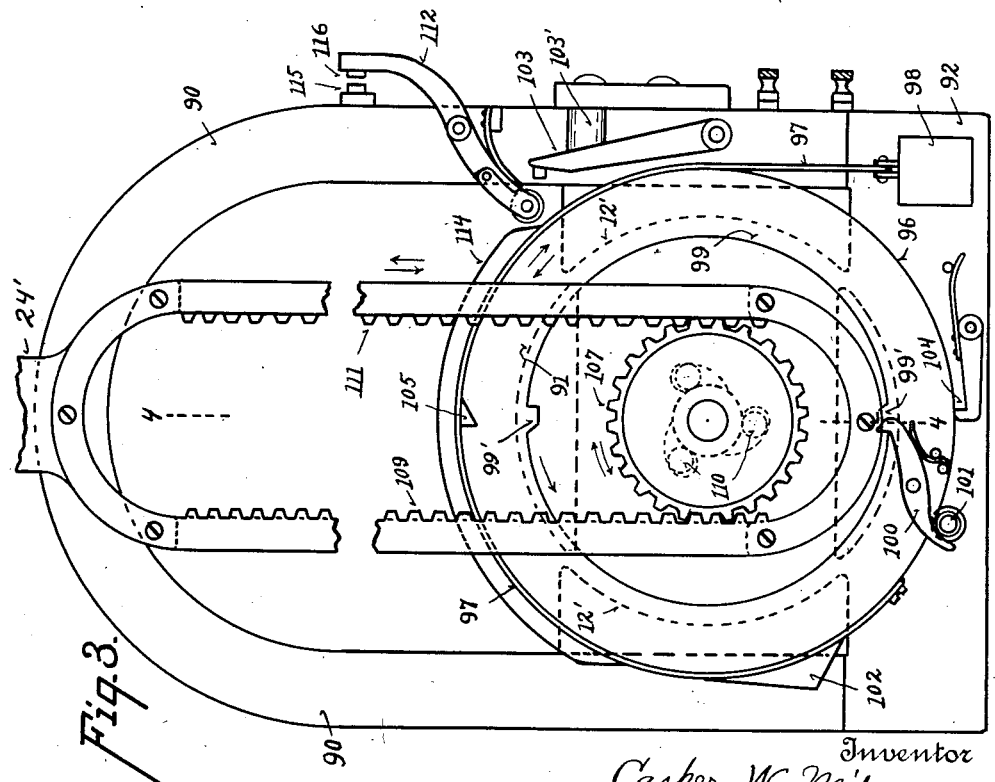
Inventor
Casper W. Miles.
By
Attorney

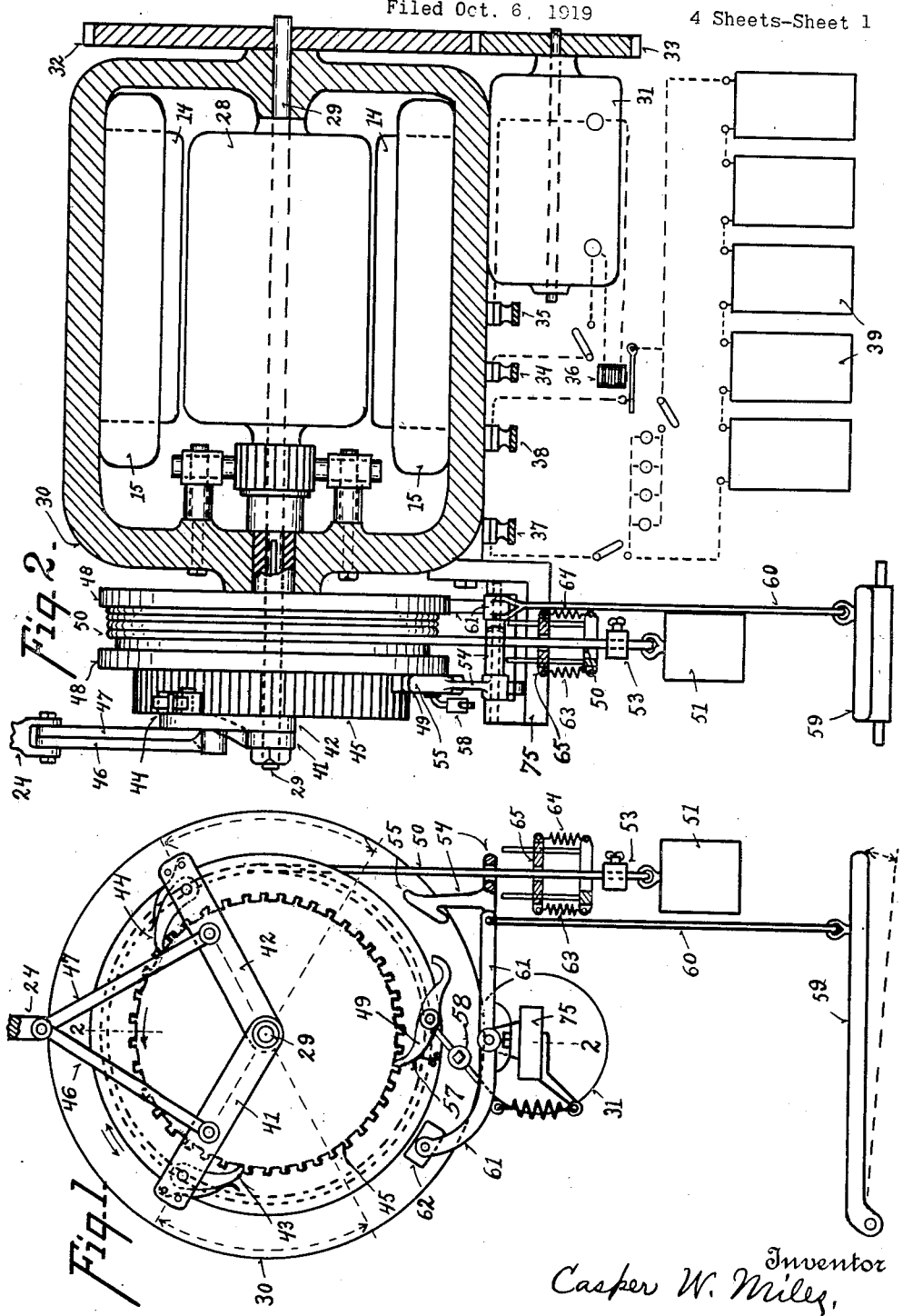

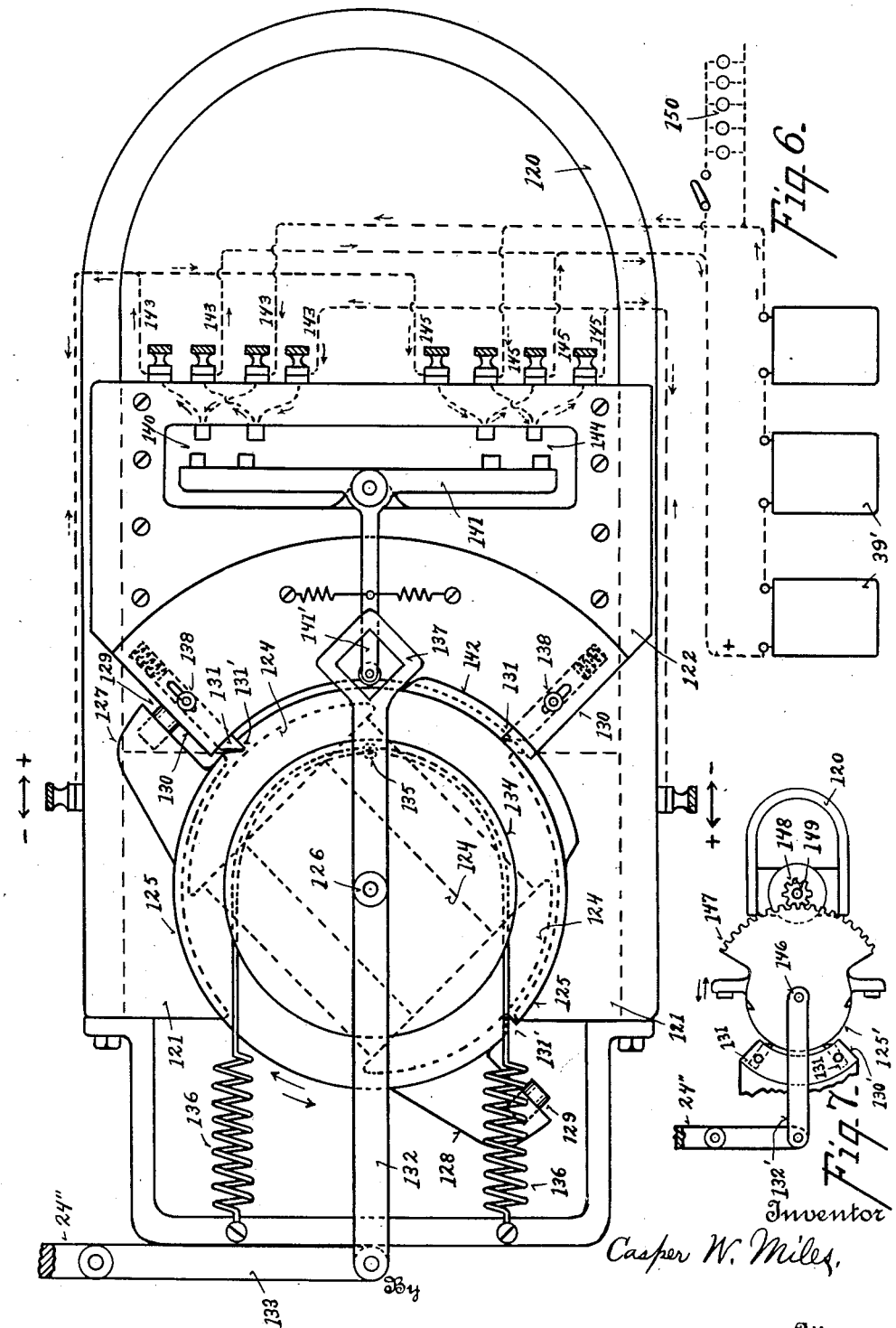

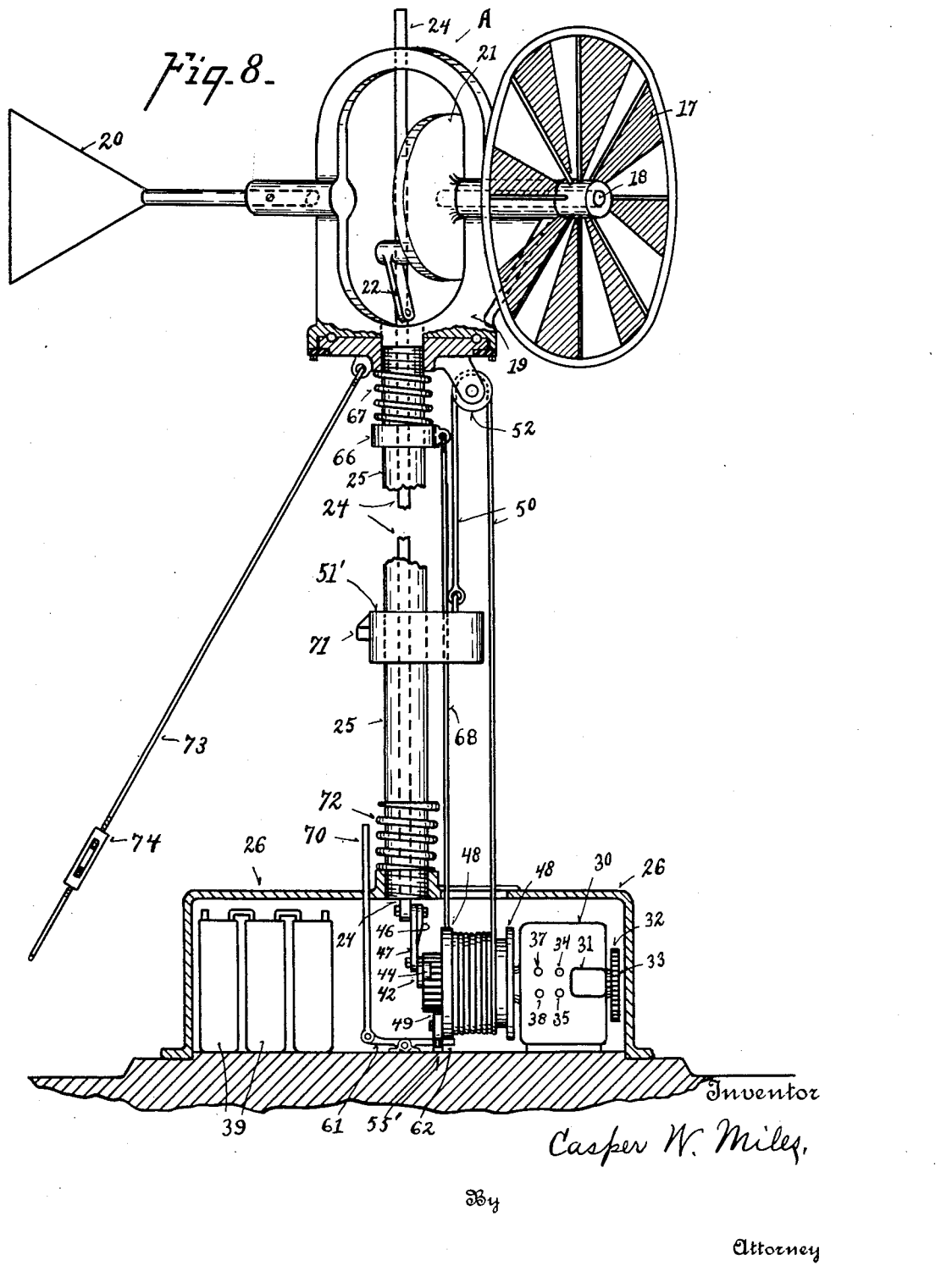

Patented Nov. 4, 1924.

1,514,093

UNITED STATES PATENT OFFICE.

CASPER W. MILES, OF ANDERSON TOWNSHIP, HAMILTON COUNTY, OHIO.

ELECTRIC GENERATING APPARATUS AND METHOD.

Application filed October 6, 1919. Serial No. 328,937.

*To all whom it may concern:*

Be it known that I, CASPER W. MILES, a citizen of the United States, residing at Anderson Township, in the county of Hamilton and State of Ohio, have invented certain new and useful Improvements in Electric Generating Apparatus and Methods, of which the following is a specification.

My invention relates to improvements in electric generating and storage method and apparatus. One of its objects is to provide an improved method for the generation and storage of electrical energy by relatively small installations or units. Another object is to provide electric generating and storage apparatus adapted to be operated by a variable source of energy, as for instance a wind-mill or wave motor. Another object is to provide electric generating apparatus adapted to be effectively operated for long periods of time with little attention. Another object is to provide electric generating apparatus adapted to be effectively operated by an actuating member having reciprocatory motion, as distinguished from rotary motion in a single direction. Another object is to provide improved exciting and electric generating apparatus having controlling or switch mechanism. Another object is to provide an improved combined actuating, generating and storage apparatus adapted to reliably maintain a supply of electrical energy in relatively small units for residential electric lighting and similar purposes. My invention also comprises certain details of form, combination, and arrangement, all of which will be fully set forth in the description of the accompanying drawings, in which, Fig. 1 is a diagrammatic end view illustrating one embodiment of my invention.

Fig. 2 is a diagrammatic view, partly in section on line 2—2 of Fig. 1, further illustrating the apparatus of Fig. 1.

Fig. 3 is a diagrammatic end view of a generator and driving mechanism illustrating a modification.

Fig. 4 is a sectional view on line 4—4 of Fig. 3.

Fig. 5 is a detail illustrating a modification of switch or automatic cut out adapted to be employed to maintain an open circuit between the generator and storage element except during the act of storage.

Fig. 6 is a diagrammatic end view of a generator illustrating another modification.

Fig. 7 is a diagrammatic end view illustrating another modification.

Fig. 8 is a diagrammatic view of a wind driven generating installation in position for use.

The accompanying drawings illustrate the preferred embodiments of my invention, in which a wind-mill A, wave motor, or similar economical but variable speed motor is employed to furnish the energy to drive an electric generator of any type suited for the purpose, and comprising as illustrated a field or exciting member, which may be a permanent magnet 90 with pole pieces 12', for small generating units, as illustrated in Figs. 3, 4, 6, and 7, or may comprise an electrically excited field with an electromagnet 14 and field winding 15 therefor as illustrated in Figs. 1 and 2.

As illustrated in Fig. 8 the wind driven wheel 17 is mounted upon a shaft 18 journaled in a rotatably mounted head 19 and held into the wind by a vane 20. A crank wheel 21 on the shaft 18 is connected by a pitman 22 with a vertical rod 24, which extends down through the vertical post 25 and is movable endwise to actuate the electrical generator, which is preferably located in a housing 26 at the base of the post 25.

As illustrated in Figs. 1 and 2, the electric generating member comprises a drum wound type of armature 28 mounted upon an armature shaft 29 which is journaled in the generator casing 30 preferably formed integral with the pole pieces or field member 14. In order to excite the field 14 the field windings 15 are connected in circuit with a direct current magneto 31, which is connected by gears 32 and 33 with the armature shaft 29, so that rotary movement of the armature 28 will also cause rotary movement of the armature of the magneto, the direct current from which will flow through the field coils 15 and excite the field 14. Binding posts 34 and 35 indicate where the terminals of the magneto armature are connected to the terminals of the field coils 15. The current from the armature of the magneto is also employed to energize a relay 36, which serves to close a circuit from the terminals 37 and 38 of the armature 28 through a series of storage battery cells 39 while the armature 28 is in motion, and providing for said relay to automatically open the battery charging circuit 40 as soon as energy from the magneto to said relay fails. This serves to prevent the storage battery discharging itself through the armature 28 when said armature is not in motion.

Loosely mounted upon one end of the armature shaft 29 are arms 41 and 42, which are respectively provided with pawls 43 and 44 adapted to engage the teeth of a ratchet wheel 45, also loosely journaled upon the armature shaft 29. The respective arms 41 and 42 are connected by pitmen 46 and 47 to the lower end of the reciprocating rod 24. Thus as the rod 24 moves downwardly the pawl 43 engages and drives the ratchet wheel forward, and as the rod 24 moves upwardly the pawl 44 engages and drives the ratchet wheel forward in the same direction. A spool or drum 48 is rigidly mounted upon the armature shaft 29, and has a pawl 49 which engages the teeth of the ratchet wheel 45 traveling in a path at one side of the path of pawls 43 and 44, and thereby causes the spool 48 to travel with the ratchet wheel 45 until the outer end of the pawl 49 is engaged to thereby trip or release the pawl 49 from the ratchet wheel 45, whereupon the spool 48 and with it the armature 28 and also the armature of the magneto are driven one or more, revolutions at a speed suited to develop or generate electrical energy and to store the same in the battery 39. A cord or cable 50 wound on the spool 48 and to the free end of which a weight, or if desired a spring, 51 is attached, provides for the slow and variable storage of energy with which to drive the armature, and also for adjusting the stored energy so that when it is released it may be able to drive the armature with sufficient speed and at uniform rate for a limited period to enable economical generating and storage results to be attained. As illustrated in Fig. 8 the weight is guided vertically along the exterior of post or tube 25, while the cable 50 is looped over a pulley 52 at the upper end of the post 25 and thence led downwardly to be wound upon the spool 48, thereby providing for the winding of a considerable number of turns of the cable upon the spool 48, and a movement of the weight through a considerable distance at each cycle of movement thereof. As illustrated in Fig. 1 an adjustable collar 53 on the cable 50 is adapted when the cable is sufficiently wound upon the spool 48 to engage a pivotally mounted lever 54 and shift the shoe 55 thereof into the path of travel of the outer end of the pawl 49 to thereby release the pawl 49 from the ratchet wheel 45 and permit the spool and armature shaft 29 to rotate due to the stored energy of the weight 51. A spring 57 tends to return the pawl 49 into engagement with the ratchet wheel 45, as soon as the energy of the weight has been exhausted, but while the spool 48 is rotating rapidly due to the stored energy of the weight 51, a weight 58 carried by the pawl 49 acts centrifugally to hold the pawl 49 out of engagement with the teeth of the ratchet wheel 45. As illustrated in Figs. 1 and 2, when practically all of the cable has been unwound from the spool 48 by the weight 51, the weight in its downward movement comes in contact with a pivotally mounted support 59 which has a limited movement as indicated in dotted line Fig. 1, and said support is attached by a cable or link 60 to one end of a pivotally supported brake lever 61 having a brake shoe 62 to engage the periphery of the spool 48 and bring the armature shaft 29 quickly to rest. I also preferably employ a yoke comprising two springs 63 and 64 held rigidly at their lower ends and connected to a movable cross bar 65 at their upper ends, said cross bar to be engaged by the collar 53 and put under strain just prior to the engagement of the lever 54 by the collar 53, so as to apply additional stored energy at the instant the spool 49 is released to quickly overcome the inertia of the armature and other rotary parts and cause them to quickly reach maximum and useful speed of rotation. As illustrated in Fig. 8 the ascending weight 51' at the upper limit of its travel engages a sliding collar 66 on the post 25 thereby compressing the spring 67 corresponding to the springs 63 and 64 of Fig. 1 to furnish added stored energy, and a cable or link 68 serves to introduce a member 55' corresponding to the member 55 of Fig. 1 into the path of the pawl 49 to trip the same and release the spool 48. A push-rod 70 attached at one end to the brake lever 61 of Fig. 8 is adapted to be engaged by a projection 71 carried by the weight 51' to apply brake pressure to stop the rotation of spool 48. A coiled spring 72 at the lower end of the post 24 checks the downward movement of the weight 51' at the lower limit of its movement and absorbs the energy incident to bringing the weight to a position of rest without undue shock. I preferably provide a series of guy rods 73 with turn buckles 74 connecting the upper portion of the post 25 with anchor posts set in the ground about the housing 26 to hold the post 25 in an upright position against the pressure of high winds upon the wind-mill. As illustrated in Figs. 1 and 2 the levers 54 and 61 are pivotally supported upon a bracket 75 attached to the motor casing 30.

In the modification Fig. 5 I have illustrated means of a mechanical nature to be used as a substitute for the relay 36 to open the circuit leading from the armature to the storage battery, and to close said circuit automatically due to the influence of rapid rotation of the armature during the period when the armature should be charging the battery. A pair of brushes 76 and 77 bear yieldingly upon the commutator 78 of the armature, said brushes being pivotally adjustable upon posts 79 carried by the generator casing. From one of said collector brushes the current is conveyed by a brush 80 to an insulated collector ring 81 rotating with the armature shaft. The ring 81 carries a post 83 upon which is pivotally mounted a brush holder 84 having a brush or contact 84′ to bear upon an insulated collector ring 85 also rotating with the armature shaft, and from which ring the current is conducted by a stationarily mounted brush 86. The brush or contact holder 84 has an arm 87 provided with a weight 88, which under the influence of rapid rotation of the armature shaft forces the weight 88 outwardly due to centrifugal force, and thereby also forces the brush or contact 84′ into engagement with the collector ring 85 to close the circuit so long as the armature is in rapid revolution, while the spring 89 serves to hold the contact 84′ out of engagement with the ring 85 while the armature is idle, or is being slowly rotated to store up energy.

In the modification illustrated in Figs. 3 and 4 I have illustrated a type of generator having permanent magnets 90, and an armature 91 adapted to generate direct current, preferably of the H-type having a single armature winding or coil 91′, said armature being designed to make one half revolution at a time, or if desired, a complete revolution, or several complete revolutions at each cycle of movement. The pole pieces are represented by 12′, attached to the ends of the magnets 90, and a housing 92 of non-magnetic material is employed to inclose the pole pieces and armature together with the commutator 93 and brushes 94, and to form bearings for opposite ends of the armature shaft 95. Outside the casing on the armature shaft is rigidly mounted a spool 96 on which is mounted a flat sheet metal band 97 attached at one end to the spool, and at the opposite end attached to a weight or spring 98. Loosely mounted upon the armature shaft is a ratchet wheel 99 having one or more teeth 99′ to be engaged by a pawl 100, which pawl is adapted to be tripped to release the spool 96 from the ratchet wheel by means of a pin 101 carried by the casing 92. The band 97 has attached thereto a tapered block 102 adapted when the band 97 is nearly unwound from the spool 96 to engage a yielding brake shoe 103 backed by a spring or rubber buffer 103′ to bring the spool 96 and weight 98 to a position of rest ready to commence another cycle of movement. The block 102 is so positioned with reference to the spool 96 that the spool will be brought practically to a position of rest when the pawl 104 is ready to drop into the notch or tooth 105 of the spool to positively lock the spool 96 against further rotation in the same direction until again released by the pawl 100. Also as illustrated the movement of the pawl 100 after it has been released from the ratchet wheel 99 is sufficient to cause said pawl to move to position and engage with the opposite tooth 99′ of said ratchet wheel, thereby locking the spool and ratchet wheel together again ready for another cycle of movement. The ratchet wheel 99 has a tubular hub 106 loosely journaled upon the armature shaft, and mounted exteriorly upon said hub so as to clutch and drive said hub respectively in the same direction are two gears 107 and 108. The gear 107 is in mesh with a rack 109 and is driven alternately in opposite directions as said rack is reciprocated vertically by means of the member 24′ corresponding to the member 24 of Fig. 8. The gear 107 being clutched to the hub 106 by the roller clutch members 110 at each downward thrust of the rack 109, serves to drive the ratchet wheel step by step always in one direction as indicated by the arrow Fig. 3. The gear 108 is in mesh with the rack 111, which is actuated by the member 24′ and in unison with the rack 109, and the gear 108 is automatically clutched to and drives the ratchet wheel in the same direction as the gear 107, at each upward stroke or movement of the rack 111. As illustrated each step movement of the ratchet wheel is designed to be a half revolution thereof, and to result in an engagement and release of the spool, or a complete cycle of movement, including a half revolution of the armature. If desired however by gearing the armature shaft in a ratio of two or more to one with the armature driving member, substantially as indicated in Fig. 7, the armature may be caused to make one or more complete revolutions at each cycle of movement of the ratchet wheel and spool 96. A pivotally mounted switch lever 112 is engaged at one end by a cam 114 carried by the spool 96 to temporarily and automatically close the switch contacts 115 and 116 during the period the armature is delivering direct current to the storage element, and to otherwise insure said circuit remaining open. Thus as illustrated in Figs. 3 and 4 a generating element employed to generate a direct current makes a periodic step by step movement in one direction and at substantially uniform speed ratio, suitable for accumulating a store of electrical energy.

In the modification illustrated in Figs. 6 and 7 a magnetic field, preferably a permanent magnet 120 provided with pole piece 121 and a non-magnetic housing member 122 serve to rotatably support and energize an armature 124, preferably of the H-type, and means is provided to reciprocate said armature alternately in opposite directions through from one fourth of a revolution to one or more complete revolutions, and to thereby generate a periodic direct current adapted to be accumulated in storage.

A spool member 125 is rigidly mounted upon the armature shaft 126 in Fig. 6, and said spool is provided with two stop members 127 and 128 provided with rubber buffers 129 to alternately strike opposite faces of the housing member 130 to limit the reciprocatory movement of the spool and armature. Spring actuated dogs or latch members 131 are carried by the housing member 130 to engage teeth 131' on the spool 125 to alternately lock the spool at opposite limits of its movement until released and allowed to travel under accumulated energy to the opposite limit of its movement. A reciprocating lever 132 is loosely mounted upon the armature shaft, and energized through a link 133 from the driving member 24'' corresponding to the member 24 of Fig. 8. The lever 132 carries with it a wheel or pulley 134 to which are attached at 135 one end of each of the springs 136, which tend to hold the lever 132 and pulley 134 in equilibrium at substantially the position illustrated in Fig. 6. The lever 132 also carries a releasing head 137 having cam faces to engage the rollers 138 of the latch members 131 at the respective limits of movement of the lever 132, to thereby release the spool 125 and permit it under the accumulated tension of one of the springs 136 to travel at relatively high speed to the opposite limit of its movement, where due to the gradually applied tension of the opposite spring 136 and the buffer 129, the armature is brought to a condition of rest without undue shock, and the opposite latch member engaged ready for a swing of the armature in the opposite direction. A switch lever 141 pivotally supported relative to the housing 122 serves to close one set of normally open switch contacts 140 when the armature travels in one direction, due to the engagement of the switch arm 141 with a cam 142 carried by the spool 125, and thereby close a circuit 143 indicated by full line arrows, through the armature and storage element 39'. When the armature moves in the opposite direction the cam and switch lever are engaged in the reverse direction to close the normally open switch contacts 144 and thereby close the circuit 145 indicated by dotted line arrows, and conduct the current in the same direction as before through the storage element from the armature. As illustrated in Fig. 7 the spool 125' and actuating lever 132' and other elements corresponding to the members 125 and 132 etc. of Fig. 6, are not mounted directly upon the armature shaft, but are mounted upon a separate shaft 146, and the spool 125' is provided with a gear segment 147 which meshes with a pinion 148 upon the armature shaft 149 adapted to drive the armature shaft one or more complete revolutions to each swing of the spool 125' in either direction. The stored electrical energy may be applied to electric lights 150 or any other purpose where electrical energy may be employed to advantage.

The apparatus herein disclosed has the advantages that none of the parts are necessarily of short life, and may be relied upon to remain in operative condition for relatively long periods of time, and to perform its functions practically automatically, and with a minimum expense or consumption of raw materials.

The apparatus herein illustrated and described is capable of considerable modification without departing from the principle of my invention.

What I claim is—

1. An electric generating apparatus comprising a magnetic field element, an armature having a cyclic movement relative to said field element to generate an electric current, a magneto driven in unison with said armature to excite said field element, and driving means automatically directed through a cyclic movement in which energy is first accumulated and then released and applied to actuate said armature and magneto, and a switch mechanism and circuit for said armature.

2. An electric generator apparatus comprising a magnetic field element, an armature having a cyclic movement relative to said field element to generate a unidirectional electrical pulsation at each movement of said armature, an exciting electric generator driven in unison with said armature to excite said field element, an electric accumulator, an electric circuit connecting said armature to said accumulator while current is being generated by said armature, means to automatically open said circuit except when said armature is generating current, and driving means automatically directed through a cyclic movement in which energy is first accumulated and then released and applied to actuate said armature and exciting electric generator.

In testimony whereof I have affixed my signature.

CASPER W. MILES.